(12) United States Patent
Li et al.

(10) Patent No.: US 11,054,254 B2
(45) Date of Patent: Jul. 6, 2021

(54) REAL-TIME MONITORING APPARATUS FOR SEAFLOOR DEFORMATION DURING HYDRATE EXPLOITATION

(71) Applicant: GUANGZHOU INSTITUTE OF ENERGY CONVERSION, CHINESE ACADEMY OF SCIENCES, Guangzhou (CN)

(72) Inventors: Dongliang Li, Guangzhou (CN); Qi Wu, Guangzhou (CN); Deqing Liang, Guangzhou (CN)

(73) Assignee: GUANZHOU INSTITUTE OF ENERGY CONVERSION, CHINESE ACADEMY OF SCEINCES, Guangzhou (CN)

(*) Notice: Subject to any disclaimer, the term of this patent is extended or adjusted under 35 U.S.C. 154(b) by 373 days.

(21) Appl. No.: 16/332,793

(22) PCT Filed: Dec. 15, 2017

(86) PCT No.: PCT/CN2017/116304
§ 371 (c)(1),
(2) Date: Mar. 13, 2019

(87) PCT Pub. No.: WO2019/075886
PCT Pub. Date: Apr. 25, 2019

(65) Prior Publication Data
US 2020/0318959 A1 Oct. 8, 2020

(30) Foreign Application Priority Data
Nov. 8, 2017 (CN) .......................... 201711093407.3

(51) Int. Cl.
*G01B 21/32* (2006.01)
*G01C 5/00* (2006.01)
(Continued)

(52) U.S. Cl.
CPC ............ *G01B 21/32* (2013.01); *E21B 49/001* (2013.01); *G01C 5/00* (2013.01); *G08C 17/02* (2013.01); *E21B 49/006* (2013.01)

(58) Field of Classification Search
CPC ..... G01B 21/32; E21B 49/001; E21B 49/006; E21B 47/06; G01C 5/00; G08C 17/02
See application file for complete search history.

(56) References Cited

U.S. PATENT DOCUMENTS

| 2006/0100837 A1* | 5/2006 | Symington | ........... E21B 49/006 703/10 |
| 2007/0125158 A1* | 6/2007 | Kelleher | ............... E21B 49/001 73/84 |

(Continued)

*Primary Examiner* — Orlando Bousono
(74) *Attorney, Agent, or Firm* — Bayramoglu Law Offices LLC

(57) ABSTRACT

A real-time monitoring apparatus for seafloor deformation during hydrate exploitation, includes a main frame, a detecting device, and a sensing and wireless data transmitting device. The detecting device includes at least two detecting straight rods in different directions; the detecting straight rods are connected to the main frame through the movable sleeves; and at least two fixing supports are configured below each detecting straight rod, perpendicular to and uniformly distributed along the detecting straight rod. A movable lever is configured above each detecting straight rod, the movable lever is connected to the main frame through the lever-fixing rod, and a stretchable and compressible spring is configured at an upper end of the movable lever. The sensing and wireless data transmitting device includes at least two tension and compression force sensors in different directions, a gyroscope sensor, a wireless data transmitter, and a power source, all mounted in the main frame.

5 Claims, 2 Drawing Sheets

(51) Int. Cl.
*G08C 17/02* (2006.01)
*E21B 49/00* (2006.01)

(56) References Cited

U.S. PATENT DOCUMENTS

2010/0191511 A1* 7/2010 Hsu .................. G01V 11/00
 703/1
2010/0204972 A1* 8/2010 Hsu .................. G01V 11/00
 703/10
2010/0308590 A1* 12/2010 Rohrer ................ F03B 13/188
 290/53

* cited by examiner

REAL-TIME MONITORING APPARATUS FOR SEAFLOOR DEFORMATION DURING HYDRATE EXPLOITATION

CROSS REFERENCE TO THE RELATED APPLICATIONS

This application is the national phase entry of International Application No. PCT/CN2017/116304, filed on Dec. 15, 2017, which is based upon and claims priority to Chinese Patent Application No. CN201711093407.3, filed on Nov. 8, 2017, the entire contents of which are incorporated herein by reference.

TECHNICAL FIELD

The present invention relates to the technical field of energy exploitation, and particularly relates to a real-time monitoring apparatus for seafloor deformation during hydrate exploitation.

BACKGROUND

Natural gas hydrates are crystalline substances formed by the combination of natural gas and water under low temperature and high pressure. They are commonly known as "flammable ice" as they are ice like and flammable, and which are widely distributed in permafrost regions and seafloors. It is estimated that the carbon content of the natural gas hydrates in nature are twice the total carbon content of other fossil energy sources, making them a potential energy resource.

At present, three major exploitation methods have been proposed, including the depressurization method, the thermal injection method, and the chemical inhibitor injection method. For seafloor natural gas hydrate reservoirs, the exploitation conditions are harsh, and it is more difficult to exploit. Seafloor natural gas hydrate reservoirs bear the weight of seafloor strata to some extent, and the occurrence of natural gas hydrates can enhance the mechanical strength of the seafloor sediments. During exploitation, due to a large-scale dissociation of natural gas hydrates, the mechanical strength of natural gas hydrate deposit will be reduced, the sediments which were originally bonded together lose their stability and slip or collapse under the high pressure of seawater, causing submarine landslide which threaten the exploitation safety. Besides, if a seafloor earthquake occurs during exploitation, it will also cause a large-scale dissociation of natural gas hydrates, affecting the exploitation directly or indirectly. Further, exploitation or natural hazards may cause seafloor stratum instability, which will induce the dissociation of natural gas hydrates; the dissociated gas will acidify the ocean, and natural gas spilling into the atmosphere can exacerbate global warming.

In summary, during exploitation of seafloor natural gas hydrates, it is crucial to monitor the subsidence and deformation of seafloor strata, and seafloor earthquakes. At present, no country has realized the large-scale commercial exploitation of seafloor natural gas hydrates, information relevant to the trial exploitation is also kept confidential; there are rare reports on the monitoring techniques for subsidence and deformation of seafloor strata, especially for small deformation, the type of deformation, and seafloor earthquakes.

SUMMARY

One object of present invention is to provide a real-time monitoring apparatus for seafloor deformation during hydrate exploitation, which can realize the real-time monitoring of subsidence and small deformation of seafloor strata and the type of deformation.

The present invention is realized by the below technical solution.

A real-time monitoring apparatus for seafloor deformation during hydrate exploitation, comprising a main frame, a detecting device, and a sensing and wireless data transmitting device;

an inverted U-shaped handle is provided on a top of the main frame, and at least two movable sleeves and at least two lever-fixing rods are provided around the main frame;

the detecting device comprises at least two detecting straight rods in different directions; the detecting straight rods are connected to the main frame through the movable sleeves and configured to transversely extend and retract; at least two fixing supports are provided below each detecting straight rod, perpendicular to and uniformly distributed along the detecting straight rod, and configured to fix the whole apparatus; a movable lever is provided above each detecting straight rod and configured to amplify a monitored actual deformation value, the movable lever is connected to the main frame through the lever-fixing rod, and a stretchable and compressible spring is provided at an upper end of the movable lever;

the sensing and wireless data transmitting device comprises at least two tension and compression force sensors in different directions, a gyroscope sensor, a wireless data transmitter, and a power source, all mounted in the main frame; the tension and compression force sensors are connected to the movable levers through the stretchable and compressible springs, and configured to monitor tension and compression forces of the stretchable and compressible springs to acquire a response of s small seafloor deformation, and a type of the seafloor deformation can be determined from a change in the tension and compression forces; the gyroscope sensor is disposed at a center of the main frame and configured to monitor a response of a seafloor subsidence or shock; the wireless data transmitter is configured to realize a real-time transmission of monitoring data.

Further, the main frame is a spherical mechanism, made of a pressure-resistant and corrosion-resistant material.

Further, the tension and compression force sensors, the gyroscope sensor and the wireless data transmitter are high-pressure-resistant and waterproof.

Further, a handle-lifting line is provided at a top of the inverted U-shaped handle, and a protective cable-fixing rod and a protective cable are provided above each detecting straight rod; the protective cables support the whole apparatus through the protective cable-fixing rods and in combination with the handle-lifting line.

The present invention has the following advantages:

(1) The present invention can realize the real-time monitoring of small seafloor deformation and simultaneous determination of deformation type and deformation degree; it is simple in principle and easy to realize.

(2) The present invention can realize the real-time monitoring of seafloor subsidence or seafloor earthquake, guaranteeing the exploitation safety.

REFERENCE NUMBERS

1: Main frame; 2: movable sleeve; 3: wireless data transmitter; 4: inverted U-shaped handle; 5: stretchable and compressible spring; 6: lever-fixing rod; 7: movable lever; 8: protective cable-fixing rod; 9: protective cable; 10: handle-lifting line; 11: detecting straight rod; 12: fixing support; 13: power supply; 14: tension and compression force sensor; 15: gyroscope sensor.

DETAILED DESCRIPTION OF THE EMBODIMENTS

Embodiment

Figure 1:
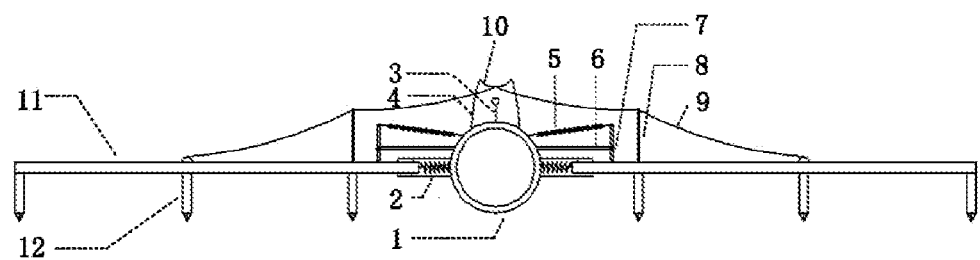
FIG. 1 is a front view of the present invention.
Figure 2:
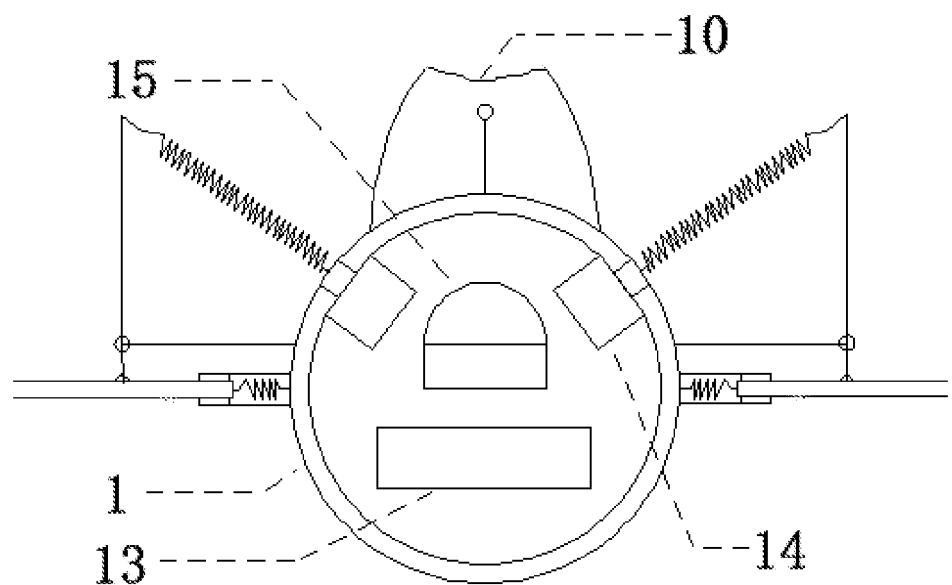
FIG. 2 is a schematic drawing of the spherical main structure of the present invention.
Figure 3:
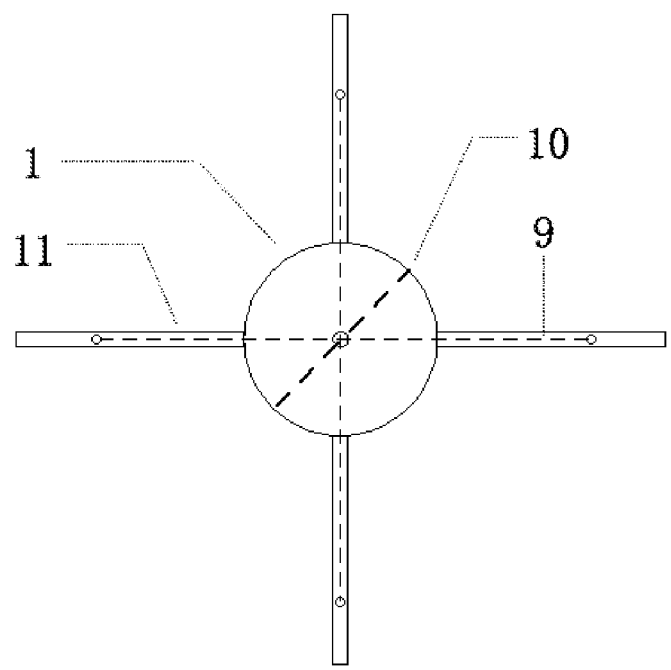
FIG. 3 is a top view of the present invention.

Reference is made to FIGS. 1 to 3, it is a real-time monitoring apparatus for seafloor deformation during hydrate exploitation, comprising a main frame 1, a detecting device, and a sensing and wireless data transmitting device.

An inverted U-shaped handle 4 is provided on a top of the main frame 1, and at least two movable sleeves 2 and at least two lever-fixing rods 6 are provided around the main frame 1.

The detecting device comprises at least two detecting straight rods 11 in different directions; the detecting straight rods 11 are connected to the main frame 1 through the movable sleeves 2 and configured to transversely extend and retract. At least two fixing supports 12 are provided below each detecting straight rod 11, perpendicular to and uniformly distributed along the detecting straight rod 11 and configured to fix the whole apparatus. A movable lever 7 is provided above each detecting straight rod 11 and configured to amplify a monitored actual deformation value, the movable lever 7 is connected to the main frame 1 through the lever-fixing rod 6, and a stretchable and compressible spring 5 is provided at an upper end of the movable lever 7.

The sensing and wireless data transmitting device comprises at least two tension and compression force sensors 14 in different directions, a gyroscope sensor 15, a wireless data transmitter 3, and a power source 13, all mounted in the main frame. The tension and compression force sensors 14 are connected to the movable levers 7 through the stretchable and compressible springs 5, and configured to monitor tension and compression forces of the stretchable and compressible springs 5 to acquire a response of s small seafloor deformation, and a type of the seafloor deformation can be determined from a change in the tension and compression forces (a decrease in the force indicates that it is a swelling, while an increase in the force indicates that it is a compression). The gyroscope sensor 15 is disposed at a center of the main frame 1 and configured to monitor a response of a seafloor subsidence or shock. The wireless data transmitter 3 is configured to realize a real-time transmission of monitoring data.

The main frame 1 is a spherical mechanism, made of a pressure-resistant and corrosion-resistant material. The tension and compression force sensors 14, the gyroscope sensor 15 and the wireless data transmitter 3 are high-pressure-resistant and waterproof. A handle-lifting line 10 is provided at a top of the inverted U-shaped handle 4, and a protective cable-fixing rod 8 and a protective cable 9 are provided above each detecting straight rod 11; the protective cables 9 support the whole apparatus through the protective cable-fixing rods 8 and in combination with the handle-lifting line 10.

In the instant embodiment, the depth of water was 1,200 meters, and the main frame 1 had a diameter of 50 cm and could withstand an external pressure of 20 MPa. The detecting straight rods 11 were 5 meters long, the fixing supports 12 were 60 cm long, and parts exposed to seawater were all made of corrosion-resistant materials. The stretchable and compressible springs 5 were 120 cm long, had a range of extension and retraction of ±60 cm, can withstand a force ranging from 0 to 500 N. The tension and compression force sensors 14 could monitor force ranging from 0 to 20 kN, and had a sensitivity of 1 N. The accuracy for measuring the seafloor deformation was 1 mm. The electronic gyroscope sensor 15 employed a three-dimensional angle sensor, with an attitude measurement accuracy of 0.01°. The wireless transmission was realized with a underwater FSK wireless transceiver module, which had a working frequency of 27.095 MHz and a rated voltage of 1.3 to 9 V. The power supply 13 was a lithium battery pack which could function normally for two years.

When used, after the apparatus was assembled above water, the handle-lifting line 10 of the inverted U-shaped handle 5 was hung by a cable, while the protective cables 9 of the detecting straight rods 11 were supporting the whole apparatus through the protective cable-fixing rods 8 and in combination with the handle-lifting line 10, and thereby the apparatus was released to a scheduled position at seafloor. When the apparatus reached the scheduled region, it was fixed to the seafloor with the aid of the gravity on it, as the fixing supports 12 were inserted into the seafloor overburden. As the pressure of water at seafloor might induce an initial value on the tension and compression force sensors 14, and, it was possible that the apparatus was not fully horizontal during the release process, therefore, after the release process was complete, the values on the sensors were reset to zero. When a stratum subsidence or seafloor earthquake caused by the exploitation of natural gas hydrates occurred at seafloor, the gyroscope sensor 15 would timely detect the relevant signals, allowing the working platform to react rapidly. When a stratum contraction occurred, the detecting straight rods 11 would be retracted by the movable sleeves 2, causing the stretchable and compressible springs 5 to be stretched and thereby the tension and compression force sensors received tension signals which would be transmitted in real time; as such, the type of the sea floor deformation was determined to be contraction, a direction of the contraction could be determined through the signals of different directions, and a degree of the contraction could be determined through the magnitudes of the force change. Similarly, when a stretching deformation occurred at seafloor, it could be determined through the corresponding force signals.

The detailed description above is a detailed description of the possible embodiment of the present invention, which is not intended to limit the scope of the invention. Any equivalent or modification that does not depart from the invention should be included in the scope of the invention.

What is claimed is:
1. A real-time monitoring apparatus for seafloor deformation during hydrate exploitation, comprising: a main frame, a detecting device, and a sensing and wireless data transmitting device; wherein an inverted U-shaped handle is provided on a top of the main frame, and at least two movable sleeves and at least two lever-fixing rods are provided around the main frame;

the detecting device comprises at least two detecting straight rods in different directions; the detecting straight rods are connected to the main frame through the movable sleeves; at least two fixing supports are provided below each detecting straight rod, perpendicular to and uniformly distributed along the detecting straight rod; a movable lever is provided above each detecting straight rod, the movable lever is connected to the main frame through the lever-fixing rod, and a stretchable and compressible spring is provided at an upper end of the movable lever;

the sensing and wireless data transmitting device comprises at least two tension and compression force sensors in different directions, a gyroscope sensor, a wireless data transmitter, and a power source; the at least two tension and compression force sensors, the gyroscope sensor, the wireless data transmitter, and the power source are, all mounted in the main frame; the tension and compression force sensors are connected to the movable levers through the stretchable and compressible springs, and the gyroscope sensor is disposed at a center of the main frame.

2. The real-time monitoring apparatus for seafloor deformation during hydrate exploitation according to claim 1, wherein the main frame is a spherical mechanism made of a pressure-resistant and corrosion-resistant material.

3. The real-time monitoring apparatus for seafloor deformation during hydrate exploitation according to claim 1, wherein the tension and compression force sensors, the gyroscope sensor and the wireless data transmitter are high-pressure-resistant and waterproof.

4. The real-time monitoring apparatus for seafloor deformation during hydrate exploitation according to claim 1, wherein a handle-lifting line is provided at a top of the inverted U-shaped handle.

5. The real-time monitoring apparatus for seafloor deformation during hydrate exploitation according to claim 1, wherein a protective cable-fixing rod and a protective cable are provided above each detecting straight rod.

* * * * *